UNITED STATES PATENT OFFICE.

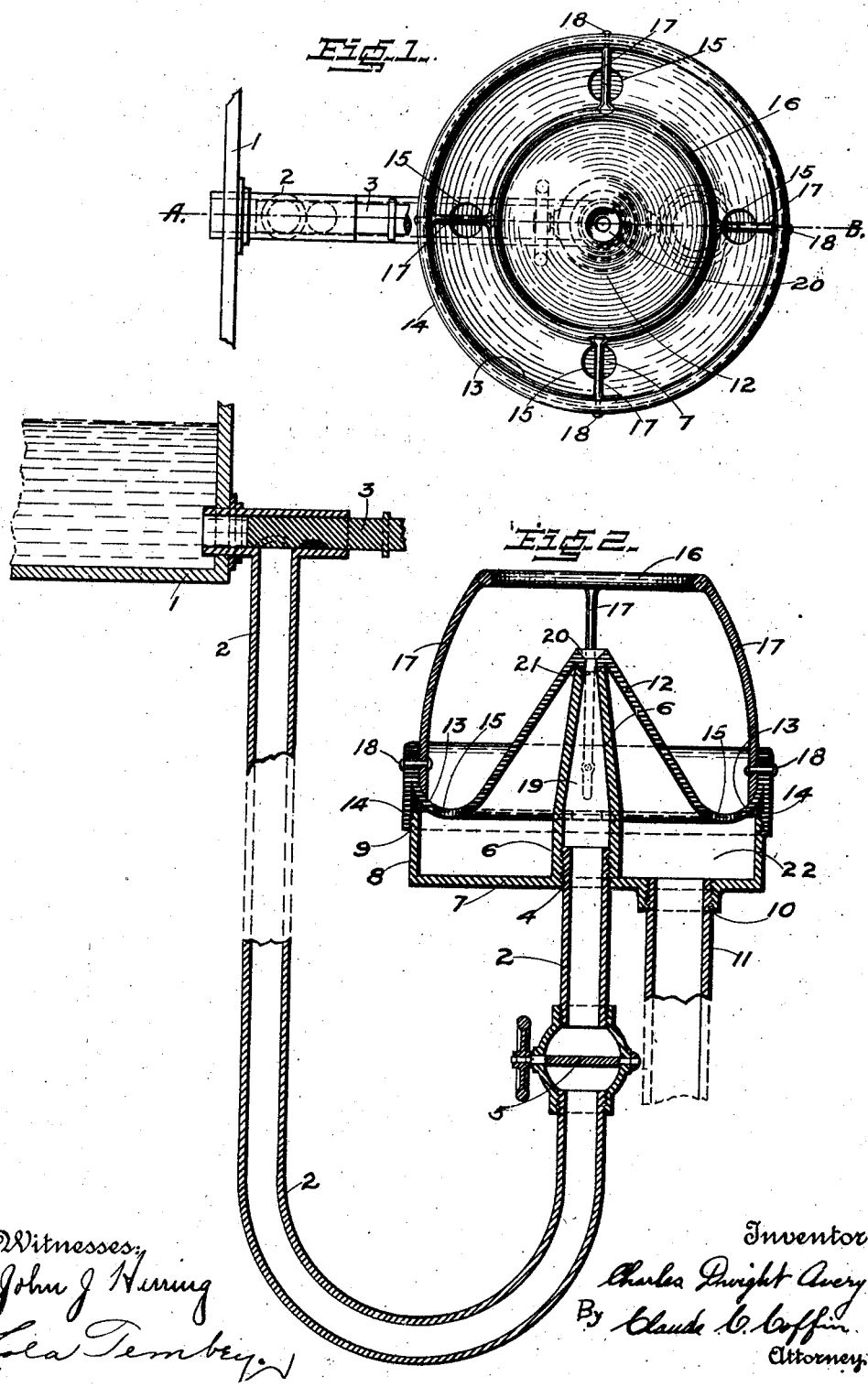

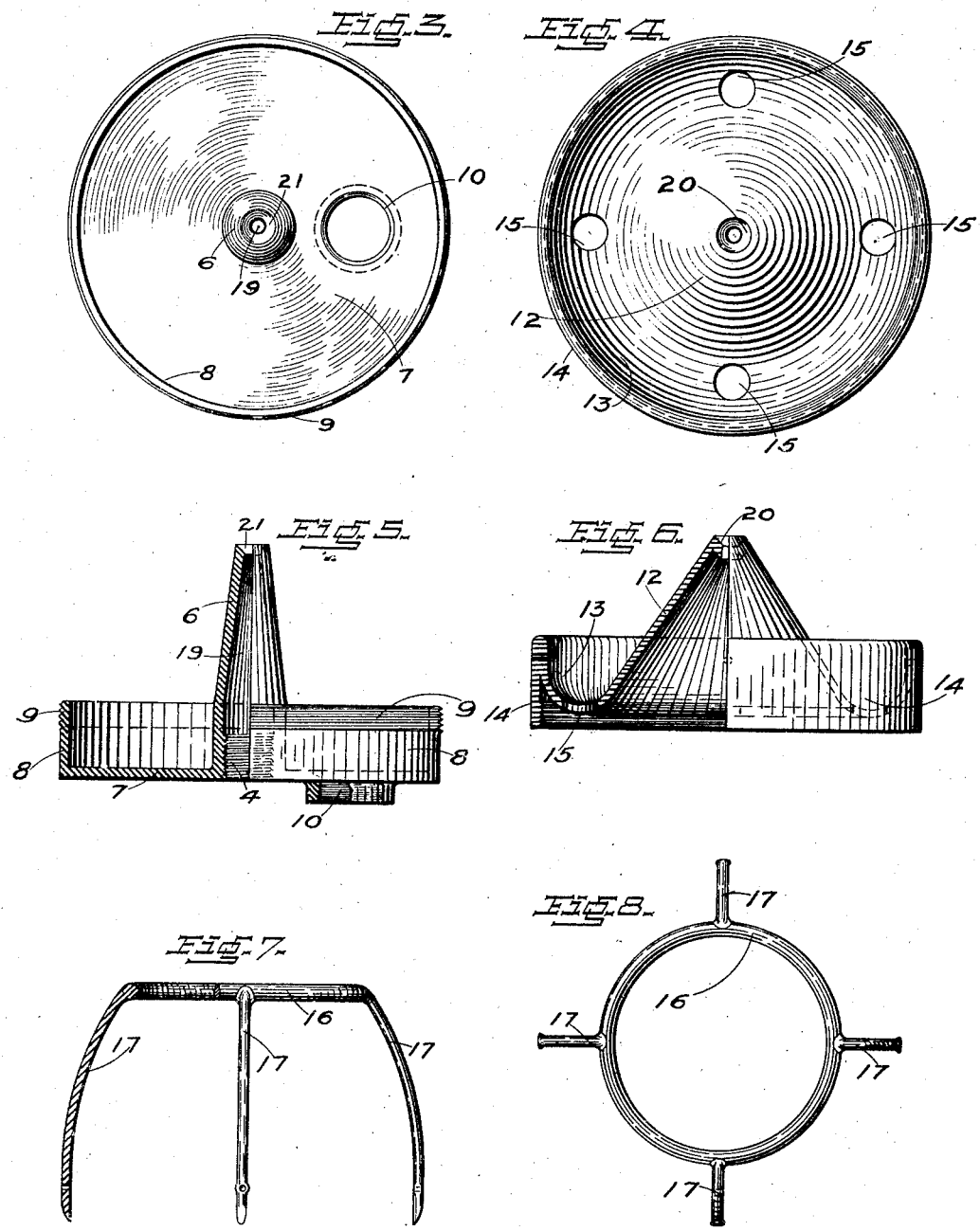

CHARLES DWIGHT AVERY, OF CHEYENNE, WYOMING.

SANITARY DRINKING-FOUNTAIN.

1,039,880.   Specification of Letters Patent.   Patented Oct. 1, 1912.

Application filed November 17, 1911. Serial No. 660,820.

*To all whom it may concern:*

Be it known that I, CHARLES DWIGHT AVERY, a citizen of the United States, residing at Cheyenne, in the county of Laramie and State of Wyoming, have invented new and useful Improvements in Sanitary Drinking-Fountains, of which the following is a specification.

My invention relates to improvements in sanitary drinking fountains for use especially in railway coaches, offices and other public places where a continual flow of water is not available.

The object of my improvements is to provide a cheap, sanitary, durable and simply constructed fountain with removable parts capable of being easily cleansed, at the same time ornamental, and one whereby the drinking water may be conserved. I attain these objects by the construction illustrated in the accompanying drawings, in which—

Figure 1 is a plan view of the fountain and water supply connections. Fig. 2 is a central vertical section on the plane of line "A—B", Fig. 1. Fig. 3 is a detail plan view of the inner cone. Fig. 4 is a detail plan view of the outer cone. Fig. 5 is a detail view of the inner cone, the right half being in side elevation, and the left half being in section on the central vertical plane. Fig. 6 is a corresponding detail view of the outer cone. Fig. 7 is a corresponding detail view of the guard ring and supports. Fig. 8 is a detail plan view of the guard ring and supports.

The same numerals refer to similar parts throughout the several views.

Number 1 is a water tank, water main or any suitable source of supply of drinking water, to which is connected the drinking fountain by means of feed pipe 2. At any convenient place in feed pipe 2 is located a spring push valve 3 to control the flow of water to the drinking fountain. Pipe 2 is supported by the water tank, or by any suitable means, and the fountain end of the pipe is curved in such manner that when in place it stands in a vertical position to support the drinking fountain, and is threaded at 4 to allow the inner cone 6, threaded to correspond, to be screwed on and supported by pipe 2; 5 is any suitable regulating valve in pipe 2 to regulate the flow and fountain of water.

6 is a hollow pipe like inner cone threaded inside at its base to screw on pipe 2, and open at its apex at 21 forming an inner water chamber 19. Inner cone 6 has a horizontal disk flange 7 and the disk is again flanged vertically at 8 forming a cup or outer water chamber 22. Vertical flange 8 is threaded at 9 to permit the outer or fountain cone 12, threaded to correspond, to be screwed into place over the rim of the cup-like chamber of the inner cone. The base flange 7 of the inner cone is provided with a threaded outlet 10 into which may be screwed a drain pipe 11.

Outer or fountain cone 12 has a rolling flange 13 at its base with a reverse flange 14 thereon threaded inside to screw on the inner cone threads 9 on the cup rim; this outer cone 12 is provided at its base with any suitable number of drains 15, and is hollow and open at its apex forming a water vent or fountain nozzle 20. When screwed into place the open apex 21 of the inner cone fits tightly up against the inside of the apex of the outer cone and water chamber 19 is brought to coincide with the water vent 20 of the outer cone, the open apexes of the two cones being in juxtaposition.

A guard ring 16 is supported symmetrically above the two cones by supports 17 screwed or riveted to the flange 13 of the outer cone by screws or rivets 18. The guard ring is supported above the apex of the fountain cone so that a person drinking will rest against the ring and his lips will not touch any part of the fountain.

In operation the spring push valve is pushed allowing water to pass through pipe 2, with its regulating valve 5 set to allow the proper force of water at the fountain nozzle 20, through the inner water chamber 19 of the inner cone up through the water vent 20 at the apex of the outer cone forming a fountain above the outer cone and inside the guard ring and spilling over the entire outer surface of the outer cone 12. The waste water caught by the rolling flange 13 passes through drains 15 into the outer chamber 22 formed by the flanges on the base of the inner cone and thence through the outlet 10 into drain pipe 11 where it is carried to a sewer or any suitable place.

The person drinking places his mouth inside and against the guard ring above the fountain formed at the fountain nozzle and drinks directly from the fountain without the lips touching the fountain cone, physical contact with any portion of the fountain cone being prevented by the guard ring. The flow of water at the time of drinking washes off the entire outer surface of the outer cone. Water conservation is effected since there will be no tendency to cause the water to run while the person is not drinking.

The entire fountain or parts may be made of any suitable material, as metal, glass or porcelain, and if made of metal all exposed parts may be nickel plated to prevent rust and corrosion.

I claim:—

1. The combination in a drinking fountain of an inner hollow cone open at its apex and base having a cup-like outer chamber formed by flanges at the base of said inner cone, an outer cone open at its apex having a rolling flange at its base adapted to fit over the outer chamber of the inner cone, and the open apex of the outer cone adapted to fit upon the apex of the inner cone, with a guard ring supported adjacent and above the apex of the outer cone.

2. The combination in a drinking fountain of the hollow outer cone open at its apex having a rolling flange at its base with a reverse flange on said rolling flange, an inner hollow cone having an open apex adapted to fit against the inner side of the open apex of the outer cone, said inner cone having flanges at its base adapted to support the outer cone with means consisting of water connections to deliver water inside the inner cone.

3. The combination of an inner cone having an inner pipe-like chamber open at its apex and threaded at its base and having an outside disk flange on its base, said disk flange being flanged vertically forming a cup-like outer chamber, an outlet in the base of said cup-like outer chamber, an outer cone supported above said inner cone having an open apex in juxtaposition with the open apex of the inner cone, said outer cone having a rolling flange at its base with drains to the outer chamber of the inner cone, a guard ring supported upon the flange of the outer cone above and adjacent to the open apex of the outer cone, substantially as described.

4. The combination in a drinking fountain of a hollow inner cone open at its apex and adapted to screw on a pipe at its base, said inner cone being flanged at its base forming a cup-like outer chamber, an outer fountain cone open at its apex adapted to fit over the inner cone with its open apex in juxtaposition with the open apex of the inner cone, said outer cone having a rolling flange at its base perforated to form outlets, said rolling flange having a reverse flange adapted to screw upon the rim of the cup-like outer chamber of the inner cone, a guard ring supported above and adjacent to the open apex of the outer cone b supports attached to the flange of the outer cone substantially as described.

5. In a drinking fountain a water pipe with a control valve therein, said pipe supporting an inner cone having an inner chamber connected with said pipe and an outer chamber formed by flanges at the base of said inner cone, said inner chamber having an opening at the apex of the cone and said outer chamber having an outlet, an outer cone supported above said inner cone having an open apex coinciding with the open apex of the inner cone, said outer cone having a flange at its base with drains into the outer chamber of the inner cone, with a guard ring held by supports attached to said outer cone above and symmetrical with the open apex of the outer cone, substantially as described.

CHARLES DWIGHT AVERY.

Witnesses:
H. W. RAYMOND,
E. O. FULLER.

---

Copies of this patent may be obtained for five cents each, by addressing the "Commissioner of Patents, Washington, D. C."